United States Patent [19]
McClellan

[11] 4,323,088
[45] Apr. 6, 1982

[54] INSULATING PIPE SUPPORT
[75] Inventor: William F. McClellan, San Jose, Calif.
[73] Assignee: Pipe Shields, Inc., San Jose, Calif.
[21] Appl. No.: 95,980
[22] Filed: Nov. 20, 1979
[51] Int. Cl.³ .......................... F16L 3/12; F16L 59/08
[52] U.S. Cl. .................................... 138/106; 138/149; 138/157; 248/62
[58] Field of Search ............... 138/106, 107, 140, 147, 138/149, 157; 248/62

[56] References Cited
U.S. PATENT DOCUMENTS 3,122,346  2/1964  Seiler ................................... 138/107
3,539,137 11/1970  March .................................... 248/62
3,563,503  2/1971  Lancaster ............................ 138/106
3,987,991 10/1976  Keever et al. ...................... 138/106

Primary Examiner—Steven L. Stephan
Attorney, Agent, or Firm—Thomas E. Schatzel

[57] ABSTRACT

An insulating pipe support device including a pair of opposing members which telescopically engage to form a cylindrical solid having an axial hole therethrough, each of the members including a strong exterior frame and a plurality of identically inserted half rings, each including a troughlike arcuate depression about its origin, the half rings being structured to form identical axially exterior inserts of a material having superior insulation characteristics and moderate load carrying ability and an axially interior support ring constructed of a material having superior load carrying characteristics and moderate insulating ability.

5 Claims, 5 Drawing Figures

U.S. Patent Apr. 6, 1982 4,323,088
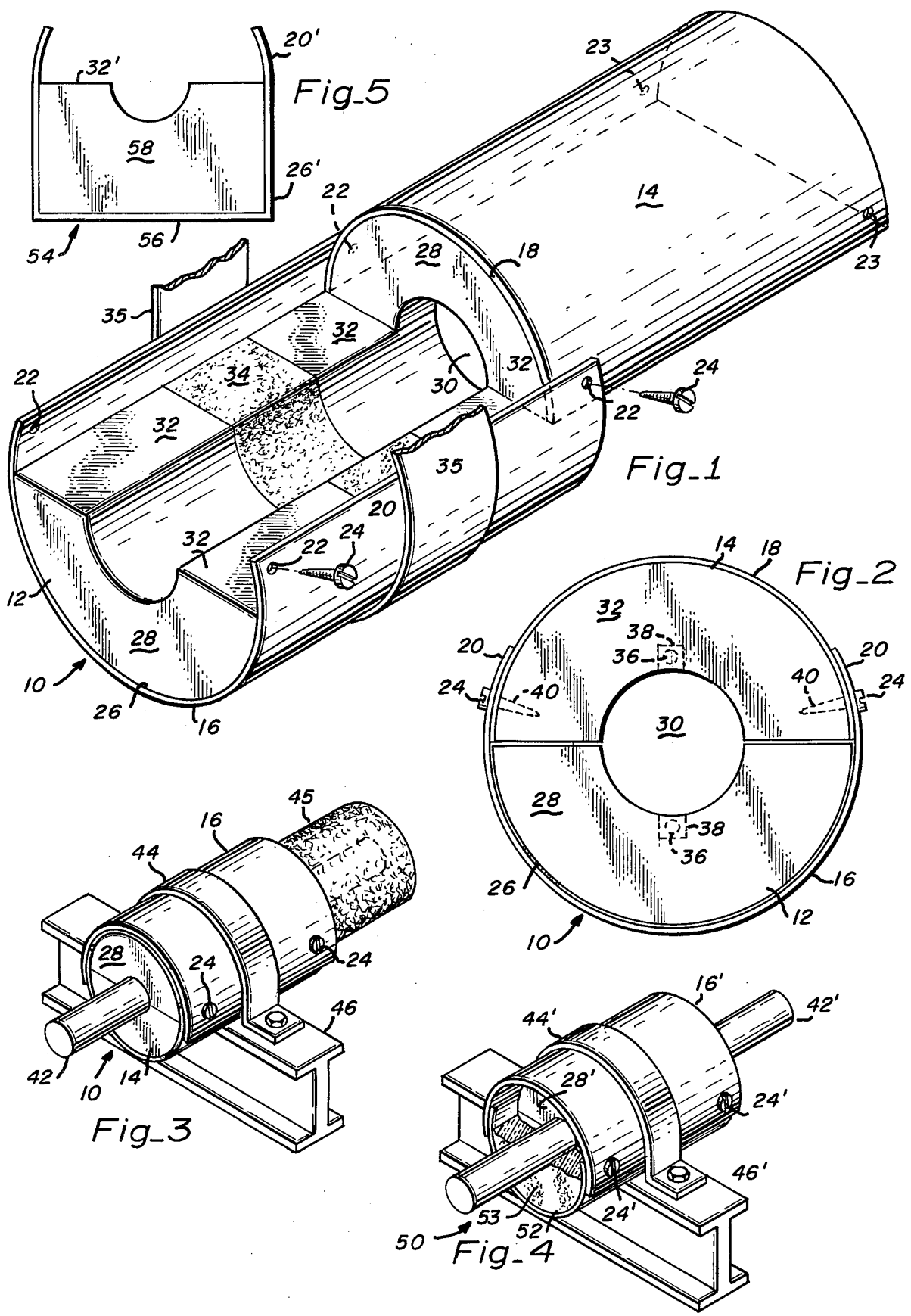

INSULATING PIPE SUPPORT

BACKGROUND OF THE INVENTION

1. Field of the Invention

This invention relates generally to devices for supporting elongated structures and more specifically to devices for insulating and supporting pipes.

2. Description of the Prior Art

Modern construction, particularly in industrial plants and power generation facilities, frequently requires the use of insulated pipes for carrying hot or cold liquids or gases. This insulation is necessary to prevent the transfer of heat between the pipe and the liquid or gas contained therein in the surrounding environment. Additionally, modern construction codes frequently require that all pipes carrying materials of temperatures differing significantly from the ambient temperature must be insulated.

In a typical construction application an insulated pipe will be displaced from the support surface such that it may be necessary to support it by virtue of hangers if the pipe is to be supported from above, by cantilevers if the pipe is to be supported from the side, and by pedestals if the pipe is to be supported from below. In each of these cases it is necessary that a firm contact restricting the pipe from movement in the directions perpendicular to its axis to be achieved between the support member and the pipe. While direct metal-to-metal welding or clamping is strongest and securest and thus preferable for this purpose alone, several difficulties arise in connection with this practice in applications wherein the pipe must be insulated. Even if the clamp or weld is subsequently wrapped or coated with insulation, there remains a conductive heat transfer path through the clamp or weld to the support structure, thus generating a significant heat transfer between the environment and the pipe. This substantially defeats the purpose of the insulation.

Various attempts have been made in the prior art to achieve firm lateral and longitudinal support of a pipe while maintaining the proper insulation thereof. Examples of these attempts are to be found in U.S. Pat. No. 3,530,899 issued to Dillard Breeding, U.S. Pat. No. 3,559,694 issued to Fred J. Volberg, U.S. Pat. No. 3,848,897 issued to William McClellan, U.S. Pat. No. 3,372,894 issued to Chris J. Botsolas and U.S. Pat. No. 3,058,860 issued to Donald P. Rutter. Each of the devices described in the above-mentioned patents attempts to provide a purchase or support means for a pipe while maintaining the pipe in relative isolation from the environment by the use of an interior insulating material.

It is to be noted that in a completely insulated application the weight of the pipe will be borne directly by the insulating material. In order to maintain an effective barrier to thermal conductance from the pipe to the support structure it is necessary that the insulation be the only material actually contacting the pipe. Consequently, it is necessary that the insulating material utilized have significant load bearing capacity so as to prevent crushing of the insulating material and diminution of its insulating characteristics. Consequently, the insulating material utilized in such supports must be of significantly greater density and load carrying ability than material which may be utilized in intermediate points wherein no load carrying capacity is required. Such higher density load carrying material is more costly to manufacture and machine than the lower density insulation utilized on the remainder of the pipe.

Another difficulty which the prior art pipe supports have attempted to address is the ease and security of installation of the support member on the pipe while maintaining complete insulation surrounding the pipe. The prior art cited utilizes various methods of achieving this goal as well. These include hinged support devices which close on the pipe, flexible framing on the support device such that it may be wrapped over an independent insert of insulation material, a flexible spring type outer coating of the support materials so as to hold the insulation in place against the pipe and devices wherein two portions are placed together and held by clamps. Each of these methods have disadvantages. These disadvantages include the necessity of a flexible and/or resilient outer coating material which limits the strength of the support and the requirement of additional hardware such as hinges and/or clamps which must be manufactured and assembled separately, thus increasing the cost and complexity of the devices.

A further difficulty in pipe insulating and support devices is the achievement of an effective vapor barrier. This vapor barrier is the effective air seal which prevents the exterior air, and consequently the water vapor contained therein, from coming into contact with the pipe surface. In the case of a cold pipe, water laden air contacting the pipe will result in condensation on the pipe surface which will then seep into the insulating material and diminish its insulating capacity. In the case of a hot pipe, air contacting the pipe will be heated up in such a manner that when it then contacts the cooler inner surface of the support material holding the insulation in place, condensation may take place on this surface with the same effect. Therefore, it is highly desirable to prevent the significant influx of air against the pipe surface.

None of the prior art devices utilized for supporting and insulating pipes solve all of these problems. None can satisfy the extremely high support requirements, particularly in nuclear facilities where earthquake standards must be maintained, while maintaining easy on-site assembly, easy and economical manufacture and an effective vapor barrier.

SUMMARY OF THE INVENTION

It is therefore an object of the present invention to provide an insulating support device for pipes which is capable of providing strong rigid lateral support in combination with effective insulation, adapted for easy assembly on the job site, simple in structure, economical to manufacture, and structured for maintaining an effective vapor barrier when completed.

Briefly, a presently preferred embodiment of an insulating pipe support of the present invention is a device including a pair of arcuate members designed so as to interengage telescopically to form a cylindrical solid sleeve having an axial aperture therein. The first arcuate member includes a strong metal exterior frame having rigid curved flaps extending greater than 180° and of slightly greater radius than the radius of the second arcuate member, the second arcuate member includes a strong metal exterior frame of semicircular shape. Within each of the frames, are inserted three coaxial partial rings of insulating material so as to be secured against said frames and forming a trough extending longitudinally along such ring. The trough is arcuate with an inside radius approximately equal to the outside radius of the pipe to be supported. The three partial rings of insulating material include two exterior broken rings of low density, high value insulating, moderate load-carrying material, and an interior support ring of high density, moderate value insulating, high load-carrying-ability material. Half of each of the two exterior rings are bonded to each arcuate frame and the partial rings of the interior ring are firmly bonded to the exterior arcuate frames such that no rotation or sliding takes place. A plurality of fasteners also secure the arcuate members to each other.

An advantage of the present invention is that the utilization of a relatively narrow ring of high density load bearing material in conjunction with the surrounding rings of lower density, higher insulation material achieves high levels of load capacity while sacrificing very little in the way of heat loss.

Another advantage of the present invention is that the telescoping members with securing screws provide an easily assembled and installed pipe support, firmly held in position while simultaneously minimizing complexity and cost of manufacture as well as alleviating field installation orientation problems.

These and other objects and advantages of the present invention will no doubt become apparent after a reading of the following detailed description of the preferred embodiment which is illustrated in the several figures of the drawing.

IN THE DRAWINGS

FIG. 1 is a perspective view of a preferred embodiment of an insulating pipe support of the present invention shown in a partially disassembled condition and in a hanging orientation;

FIG. 2 is an end elevation view of the assembled insulating pipe support of FIG. 1;

FIG. 3 is a perspective view of the preferred embodiment shown as assembled and installed in a typical application;

FIG. 4 is a perspective view of an alternate embodiment of the present invention; and FIG. 5 is an end elevation view of an alternate embodiment of the first arcuate member.

DETAILED DESCRIPTION OF THE PREFERRED EMBODIMENT

Illustrated in FIG. 1 and designated by the general reference character 10 is an insulating pipe support device of the preferred embodiment. The insulating pipe support 10 is adapted to provide support and insulation to a hot or cold-carrying pipe installed under circumstances where insulation is desirable.

Insulating pipe support 10 includes a first member 12 and a second member 14, each of which comprises approximately a half cylinder of semi-circular cross section. Second member 14 is constructed so as to engage first member 12 to form a complete cylindrical solid insulating pipe support 10. With specific exceptions to be noted, the construction of first member 12 and second member 14 is identical.

The peripheral exterior of first member 12 is a first arcuate support frame 16, and the peripheral exterior of second member 14 is a second arcuate support frame 18. Second frame 18 comprises a semicircle, while first frame 16 includes a pair of side wings 20 so that the frame 16 extends beyond 180° so as to fit over portions of second frame 18. Wings 20 extend such that the total arcuate extent of first frame 16 is approximately 210°. Wings 20 are an integral portion of first frame 16. Arcuate frames 16 and 18 are relatively thin, constructed of very strong material, and are only slightly flexible. The preferred material for frames 16 and 18 is stainless steel, chosen for increased resistance to corrosion. The thickness is variable depending on the load carrying requirements and the construction codes applicable to the intended use.

Wings 20 include a plurality of apertures 22, (in this embodiment, four,) which are aligned coaxially with an equal number of corresponding ring apertures 23 in the second frame 18 when the insulating pipe support 10 is assembled. Inserted through the apertures 22 in wings 20 and the corresponding apertures 23 in second arcuate support frame 18 are four securing screws 24. Securing screws 24 hold the first and second members 12 and 14 together so as to form a completed single insulating pipe support 10 of the present invention.

The interior surfaces of the first arcuate support frame 16 and second arcuate support frame 18 are firmly bonded by high pressure, high strength, high temperature resistant adhesive 26 to a rings insert 28. In the preferred embodiment adhesive 26 is Scotch-Grip 1357 structural adhesive. Rings insert 28 includes a plurality of solid cylindrical members, divided into semicircular sections, and including troughlike radial depressions which form a center hole 30 when the first and second members are juxtapositioned to form a complete ring solid. Center hole 30 is situated about the axis of origin of rings insert 28 (and consequently, of insulating pipe support device 10) and is of radius sufficient to encompass the pipe to be insulated and supported by the device. The size of center hole 30 may be selected as desired and is dependent on the radius of the pipe to be enclosed therein.

In the preferred embodiment, rings insert 28 includes three distinct ring sections arrayed side by side along the length of the cylindrical ring insert 28. The exterior sections comprise a pair of identical insulation rings 32, while the interior or central section is a support ring 34.

Each insulation ring 32 is constructed of a material having extremely high insulating properties and reasonable load-carrying properties, while the emphasis in support ring 34 is on high density excellent load-carrying characteristics with the insulating abilities of the material of secondary importance. In the preferred embodiment support ring 34 is constructed of marinite or another insulation of the marinite or marimet families, while the insulation ring 32 is calcium silicate. Marinite and marimet are stable to about 2000° F. while calcium silicate is stable to about 1500° F. The axial thickness of the support ring 34, and consequently that of the insulation rings 32, varies depending on the load carrying requirements and the width of the external support structure. The radial thickness of the rings is determined by the insulation and load requirements of the particular application.

A typical pipe support device 10 of the present invention intended to provide support to a 1-inch galvanized steel pipe carrying liquids or steam at a temperature up to about 1500° Fahrenheit would have a total radius of about 1¾ inches, a separation between frames 16 and 18 and the pipe surface of about 1⅛ inches, this being the radial thickness of the insulating rings 32 and the support ring 34, each insulating ring having an axial thickness of 2⅛ inches and the support ring having an axial thickness of 1½ inches. A support device to these specifications and using 1/16 inch galvanized steel, 13 lb. per cubic foot calcium silicate and 46 lb. per cubic foot marinite will provide superior insulation and support characteristics.

The insulating pipe support device 10 is shown in FIG. 1 as being suspended in a "U-shaped" hanger 35. In this typical application hanger 35 is approximately equal in width to the width of support ring 34. Thus the weight of the pipe is delivered directly through the marinite of support ring 34 to the hanger 35. This results in minimum pressure and weight carried by the insulating rings 32 and thereby increases the insulating characteristics of the device.

Referring to FIG. 2, an end view of an assembled insulating pipe support 10 of the present invention is shown. This view illustrates the manner in which the first and second members 12 and 14 of the invention telescope together to form a complete cylindrical whole.

In certain applications it is necessary that the temperature of all portions of the pipe be closely monitored and maintained. In such cases a tracer wire 36 (shown in phantom) is placed along the pipe in a specially constructed groove 38 (also shown in phantom) in the ring insert 32.

Also shown in phantom in FIG. 2 are the interiors of screws 24, engaging an equal number of bores 40 which extend into the material of rings insert 28. The engagement of screws 24 and bores 40 through the appropriate apertures 22 in wings 20 and apertures 23 in second frame 18 anchor the two halves of the insulating pipe support device 10 together.

FIG. 3 shows an insulating pipe support 10 of the present invention installed in a typical application. The application shown is one wherein the pipe must be supported from below. In this illustration it can be seen how a pipe 42 fits through center hole 30 of the device and is insulated and supported thereby. Insulating pipe support 10 is, in turn, secured by a bracket 44 to a beam 46. Insulating pipe support device 10 is placed upon beam 46 in such a manner that support ring 34 is situated directly upon beam 46 and within bracket 44. Thus supporting ring 34, selected for superior load bearing characteristics, bears the primary weight of the pipe. This provides the maximum support protection to pipe 42. It may be seen that in this application insulating pipe support device 10 provides maximum support to pipe 42 in all dimensions except directly along the axis of the pipe 42.

Referring now to FIG. 4, a view identical to that of FIG. 3 except in that it illustrates an alternate embodiment of the present invention. In this embodiment, an alternate insulating pipe support 50, insulating ring 28' is of lesser axial length than in the preferred embodiment and consequently does not extend out to the end of arcuate support frames 16' and 18'. Thus, a recess 52 is formed about pipe 42' as it enters the support device 10. This recess may be packed or sprayed with an insulating material 53 such that no transition effects are noted in the insulation characteristics at the point at which pipe 42 enters insulating pipe support device 10.

The preferred embodiment is adaptable to being utilized in applications wherein the pipes are to be held in any orientation although modifications, such as pressure clamps in riser applications, may be necessary in specific situations.

A further modification which may be made in insulating pipe support 10 is shown in FIG. 5. This modification is achieved by altering the exterior shape of first arcuate member 12 to form alternate arcuate member 54. Alternate member 54, and, consequently alternate first support frame 56 and alternate insert ring 58 are structured such that the bottom surface of frame 56 is flat and thus contacts a beam or other planar support element over a wide surface area rather than along the line segment contact created by the intersection of a cylinder and a plane as in the preferred embodiment. The advantage of such an alteration would come primarily in increased stability and wider distribution of force. This would cause an alleviation in point or line stress failures. The predominant disadvantage lies in the increased cost of manufacture created by the extra material and in the limited applications. It may be seen, for example, that such an embodiment would be inefficient in a hanging pipe application such as shown in FIG. 1.

The axial thickness of insulation rings 32 and support ring 34 may be adjusted to achieve the desirable balance between insulating and load bearing capabilities required by the application. It is also possible to increase the number of each type of ring although this modification is limited by the undesirability of having exterior support rings which have higher heat conductance than do the insulation rings and of having the weaker insulation rings at a prime load carrying or stress zone.

An insulating pipe support of the present invention is installed upon a pipe by placing either the first member 12 or the second member 14 against the pipe and coaxially therewith. The remaining member is then placed coaxially with the pipe and slidably engaged with the other member until the members are aligned with their ends matching and a cylindrical solid is completed with the pipe enclosed in center hole 30. Screws 24 are then inserted through aligned apertures 22 and 23 into bores 40 to secure the members together and complete the installation. It may be seen that this may be easily accomplished on continuous pipe in any orientation.

Although the present invention has been described above in terms of the presently preferred embodiment, it should be understood that such disclosure is not to be considered as limiting. Accordingly, it is intended that the appended claims be interpreted as covering all alterations and modifications, all within the true spirit and scope of the invention.

What is claimed is:

1. An insulating pipe support device comprising a first insulating support member adapted to slidably engage a second insulating support member so as to form therewith a cylindrical solid having an axial hole therethrough for receiving a pipe, each insulating support member including an exterior frame and a plurality of insulating inserts abutting each other along the common longitudinal axis of the members, at least one, but fewer than all, of said insulating inserts being constructed of a strong compression resistant material; and means for engaging the first member with the second member coaxially with a pipe such that the pipe is enclosed between the first and second members and is insulated and supported thereby, the means for slidably engaging the members including a pair of arcuate extensions to said frame of the first member extending with said frame to complete an arc of a circle of greater than 180° such that the second member may be slidably inserted from the end of the first member such that said extensions hold the second member tightly to the first member and restrict relative movement of the members except for sliding movement along the axis thereof.

2. An insulating pipe support as recited in claim 1 wherein:

said exterior frames are elongated elements of semi-circular arc cross-sections, being relatively thin and being constructed of strong rigid material; and said insulating inserts comprise a plurality of semi-cylindrical solids, each such solid having a semicircular cross-section such that it fits snugly against the interior surface of respective of said frames and each said solid further including an axial trough therein on the non-arcuate surface thereof for receiving a pipe, said insulating inserts in each of said exterior frames including a pair of axially exterior inserts of insulation material selected so as to have superior insulation capabilities and moderate load support capabillities axially surrounding an interior support ring of a material selected to have superior load support capabilities and moderate insulation capabilities.

3. An insulating pipe support as recited in claim 2 wherein:

the first and second members are secured together to form a cylindrical solid by a plurality of securing screws inserted through axially aligned apertures in said extensions and said second frame.

4. An insulating pipe support as recited in claim 1 wherein:

said insulating inserts are displaced inwards from the ends of said frames to form a recess.

5. An insulating pipe support as recited in claim 2 wherein:

said insulating inserts are comprised of calcium silicate and said strong interior support ring insert is composed of marinite.

* * * * *